(12) United States Patent
Sosnenko et al.

(10) Patent No.: US 11,460,007 B2
(45) Date of Patent: Oct. 4, 2022

(54) CABLE PROTECTION DEVICE AND WIND GENERATOR SET

(71) Applicant: Jiangsu Goldwind Science & Technology Co., Ltd., Jiangsu (CN)

(72) Inventors: Mykhailo Sosnenko, Beijing (CN); Uwe Hinz, Beijing (CN); Xingang Zhang, Jiangsu (CN)

(73) Assignee: JIANGSU GOLDWIND SCIENCE & TECHNOLOGY CO., LTD., Jiangsu (CN)

(*) Notice: Subject to any disclaimer, the term of this patent is extended or adjusted under 35 U.S.C. 154(b) by 393 days.

(21) Appl. No.: 16/611,720

(22) PCT Filed: Nov. 19, 2018

(86) PCT No.: PCT/CN2018/116157
§ 371 (c)(1),
(2) Date: Nov. 7, 2019

(87) PCT Pub. No.: WO2019/223260
PCT Pub. Date: Nov. 28, 2019

(65) Prior Publication Data
US 2021/0404444 A1    Dec. 30, 2021

(30) Foreign Application Priority Data
May 22, 2018    (CN) .......................... 201810494198.1

(51) Int. Cl.
*F03D 80/80* (2016.01)
*H02G 3/04* (2006.01)

(52) U.S. Cl.
CPC ........... *F03D 80/85* (2016.05); *H02G 3/0456* (2013.01); *F05B 2260/30* (2013.01)

(58) Field of Classification Search
CPC .. H01B 7/421; H01B 7/1875; B60R 16/0215; H02G 3/32; H02G 3/0481
(Continued)

(56) References Cited

U.S. PATENT DOCUMENTS

| 7,534,965 B1 * | 5/2009 | Thompson | H02G 3/22 174/152 G |
| 2011/0162865 A1 * | 7/2011 | Ueno | H02G 11/00 174/79 |

(Continued)

FOREIGN PATENT DOCUMENTS

| CN | 103114973 A | 5/2013 |
| CN | 204012509 U | 12/2014 |

(Continued)

OTHER PUBLICATIONS

First Australian Office Action dated May 26, 2020; Appln. No. 2018407116.

(Continued)

*Primary Examiner* — Timothy J Thompson
*Assistant Examiner* — Michael F McAllister

(57) ABSTRACT

The disclosure provides a cable protection device and a wind generator set. The cable protection device comprises: a fixing ring, which has a through hole extending along a first direction, wherein the fixing ring includes an inner side surface and an outer side surface that are opposite along a radial direction of the fixing ring, the outer side surface comprises two or more attaching surfaces, and a vertical axis is defined in the attaching surface; and a clamping member, which is disposed on the attaching surface, wherein the clamping member is deflectable at least about the vertical axis, the clamping member has at least one penetration hole penetrating along the first direction, and a cable is clamped (Continued)

within the penetration hole and is deflected about the vertical axis relative to the fixing ring within a preset range.

17 Claims, 14 Drawing Sheets

(58) Field of Classification Search
USPC .......................................................... 174/480
See application file for complete search history.

(56) References Cited

U.S. PATENT DOCUMENTS

| | | | |
|---|---|---|---|
| 2013/0068496 A1* | 3/2013 | Domesle | F03D 13/20 174/100 |
| 2013/0105199 A1* | 5/2013 | Domesle | F03D 13/20 174/138 R |
| 2014/0217741 A1* | 8/2014 | Christensen | F03D 80/85 290/55 |
| 2014/0286778 A1* | 9/2014 | Moestrup | F03D 1/06 416/205 |
| 2015/0001354 A1* | 1/2015 | Brabander | F16L 3/22 248/69 |
| 2015/0222106 A1 | 8/2015 | Caspari et al. | |
| 2015/0260166 A1* | 9/2015 | Olesen | F03D 13/10 290/55 |
| 2016/0341181 A1* | 11/2016 | Ritter | F03D 15/10 |
| 2017/0097110 A1 | 4/2017 | Hamsho et al. | |
| 2017/0321663 A1* | 11/2017 | Schmitt | F03D 80/85 |
| 2018/0187657 A1* | 7/2018 | Nielsen | F03D 80/85 |

FOREIGN PATENT DOCUMENTS

| | | |
|---|---|---|
| CN | 205117629 U | 3/2016 |
| CN | 205243735 U | 5/2016 |
| CN | 05944959 U | 2/2017 |
| CN | 205944959 U | 2/2017 |
| CN | 106532610 A | 3/2017 |
| CN | 206283203 U | 6/2017 |
| CN | 206640223 U | 11/2017 |
| CN | 206790064 U | 12/2017 |
| CN | 206929034 U | 1/2018 |
| CN | 108757352 A | 11/2018 |
| EP | 1786080 A1 | 5/2007 |
| EP | 2587054 A2 | 5/2013 |
| EP | 3096009 A2 | 11/2016 |
| WO | 2015/078626 A1 | 6/2015 |

OTHER PUBLICATIONS

The First European Office Action dated Jul. 17, 2020; Appln. No. 18903044.8.
Second Chinese Office Action dated Jul. 5, 2019; Appln. No. 201810494198.1.
The First Indian Office Action dated Jan. 5, 2021; Appln. No. 201917038103.
The extended European Search Report dated Apr. 20, 2020; Appln. No. 18903044.8.
International Search Report dated Jan. 30, 2019; PCT/CN2018/116157.
The First Chinese Office Action dated Mar. 8, 2019; Appln. No. 201810494198.1.

* cited by examiner

130

US 11,460,007 B2

CABLE PROTECTION DEVICE AND WIND GENERATOR SET

CROSS-REFERENCE TO RELATED APPLICATION

This application is a National Stage of International Application No. PCT/CN2018/116157, filed on Nov. 19, 2018, which claims priority to Chinese Patent Application No. 201810494198.1, filed on May 22, 2018, both of which are incorporated herein by reference in their entireties.

TECHNICAL FIELD

The disclosure relates to the field of wind power generation technology, and in particular to a cable protection device and a wind generator set.

BACKGROUND

The wind generator set using horizontal axes generally has a power between 0.1 MW and 10 MW. The generator, rotating blades and nacelle of the wind generator set are placed on top of the tower and rotate as the wind direction changes.

The power cables of the generator are arranged downwardly along the tower, such that the electrical energy of the wind generator set is output downwardly along the cables to the ground equipment. During the rotation of the nacelle with the wind direction, the rotation angle of the nacelle can reach 2-3 circles, which will cause the power cables to have a corresponding twisting. During the twisting of the power cables, the power cables are entangled with each other due to the excessive twisting angle, resulting in a decrease in the heat dissipation effect of the power cables.

Therefore, there is an urgent need to provide a novel cable protection device and wind generator set.

SUMMARY

In view of the above technical problems, embodiments of the disclosure provide a cable protection device and a wind generator set, which solves the technical problem that the cables of the wind generator set are entangled with each other due to twisting.

According to an aspect of an embodiment of the disclosure, there is provided a cable protection device, comprising: a fixing ring, which has a through hole extending along a first direction, wherein the fixing ring includes an inner side surface and an outer side surface that are opposite along a radial direction of the fixing ring, the outer side surface comprises two or more attaching surfaces, and a vertical axis is defined in the attaching surface; and a clamping member, which is disposed on the attaching surface, wherein the clamping member is deflectable at least about the vertical axis, the clamping member has at least one penetration hole penetrating along the first direction, and a cable is clamped within the penetration hole and is deflected about the vertical axis relative to the fixing ring within a preset range.

According to an aspect of second embodiment of the disclosure, there is provided a wind generator set, comprising: a nacelle, a tower, and the above-mentioned cable protection device. The nacelle is mounted on top of the tower in a manner of being rotatable about a longitudinal direction, the tower extends in the longitudinal direction, the cable is disposed downwardly from the nacelle along the tower, and the cable protection device is mounted onto the cable inside the tower.

In the cable protection device according to the disclosure, the cable passes through the penetration hole of the clamping member and is fixed onto the fixing ring by the clamping member, two or more attaching surfaces are provided on the outer side surface of the fixing ring, and the clamping member is deflectable at least the vertical axis on the attaching surface, such that the cable is deflectable by the clamping member about the vertical axis on the attaching surface and the cable is deflectable at least about the vertical axis within a preset range. Therefore, the problem that the cables are entangled with each other due to twisting can be effectively prevented, while the heat dissipation effect of the power cable can be ensured.

BRIEF DESCRIPTION OF THE DRAWINGS

The disclosure may be better appreciated from the following description of the embodiments of the disclosure.

Other features, objects, and advantages of the disclosure will be apparent from the following detailed description of the non-restrictive embodiments with reference to the accompanying drawings, in which the same or similar reference numerals denote the same or similar features.

Figure 1:
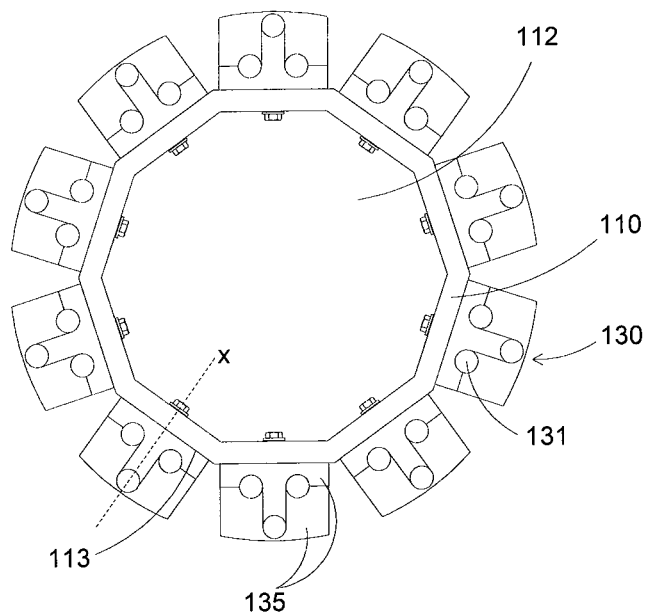
FIG. 1 is a schematic view showing structure of a cable protection device according to an embodiment of the disclosure.

Wherein:

100: cable protection device;
110: fixing ring; 111: first half ring; 112: through hole; 113: attaching surface; 114: passing-through hole;
120: clamping block; 121: second half ring;
130: clamping member; 131: penetration hole; 132: first end surface; 133: second end surface; 134: circular arc-shaped surface; 135: sub-clamping member; 135a: first arm;
135b: second arm; 135c: groove; 136: contact plane;
140: damping ring;
150: rotating shaft; 151: sliding bearing; 152: bolt;
160: adapter member; 161: first adapter member; 162: second adapter member;
100a: lowest cable protection device;
200: cable;
300: nacelle;
400: tower;
500: support member;
510: first connecting member; 511: first end; 512: second end;
520: second connecting member; 521: first connecting end; 522: second connecting end;
600: sleeve;
700: bending support member.

DETAILED DESCRIPTION

Features and exemplary embodiments according to various aspects of the disclosure are described in detail below. In the following detailed description, numerous specific details are set forth to provide comprehensive understanding of the disclosure. However, it will be apparent to those skilled in the art that the disclosure may be practiced without some of the specific details. The following description of the embodiments is merely to provide a better understanding of the disclosure. The disclosure is not limited to any specific configurations and algorithms set forth below, but involves any modifications, replacements, and improvements of elements, components, and algorithms without departing from the spirit and scope of the disclosure. In the drawings and the following description, well-known structures and techniques are not shown so as to avoid unnecessary obscuring the disclosure.

Example embodiments will now be described more comprehensively with reference to the accompanying drawings. However, the example embodiments may be embodied in many forms, and shall not be construed as being limited to the embodiments set forth herein. Rather, these embodiments are provided to make the disclosure more comprehensive and complete, and to fully convey the concept of the example embodiments to those skilled in the art. In the drawings, the thickness of the regions and layers may be exaggerated for clarity. The same reference numerals in the drawings denote the same or similar structures, and thus the detailed description thereof will be omitted.

Furthermore, the described features, structures, or characteristics may be combined in any suitable manner in one or more embodiments. In the following description, numerous specific details are set forth to provide comprehensive understanding of the embodiments of the disclosure. However, it will be appreciated by those skilled in the art that the technical solution of the disclosure may be practiced without one or more of the specific details. Alternatively, other methods, components, materials, and the like may be employed. In other instances, well-known structures, materials, or operations are not shown or described in detail so as to avoid obscuring the main technical ideas of the disclosure.

A cable protection device 100 and a wind generator set according to the disclosure are described in detail below with reference to FIGS. 1 to 26.

FIG. 1 is a schematic view showing structure of the cable protection device 100 according to an embodiment of the disclosure. The embodiment of the disclosure provides the cable protection device 100, comprising: a fixing ring 110, which has a through hole 112 extending along a first direction (i.e., the direction perpendicular to the paper surface in FIG. 1), wherein the fixing ring 110 includes an inner side surface and an outer side surface that are opposite along a radial direction of the fixing ring 110, the inner side surface faces the through hole 112 while the outer side surface includes two or more attaching surfaces 113, and a vertical axis x is defined on the attaching surface 113; and a clamping member 130, which is disposed on the attaching surface 113, wherein the clamping member 130 is deflectable at least about the vertical axis x, the clamping member 130 has at least one penetration hole 131 penetrating along the first direction, to allow the cables 200 to pass therethrough and be clamped within the penetration holes 131 and be deflectable about the vertical axis x relative to the fixing ring 110 within a preset range.

The vertical axis x on the attaching surface 113 is disposed as shown in FIG. 1, and the vertical axis x is perpendicular to the attaching surface 113.

During the use of the cable protection device 100 according to the disclosure, the cable protection device 100 is disposed onto the cable 200, the cable 200 passes through the penetration hole 131 of the clamping member 130 and is fixed to the fixing ring 110 by the clamping member 130, the two or more attaching surfaces 113 are provided on the outer side surface of the fixing ring 110, and the clamping member 130 is deflectable at least about the vertical axis x on the attaching surface 113, and therefore the cable 200 is deflectable by the clamping member 130 about the vertical axis x on the attaching surface 113.

Figure 2:
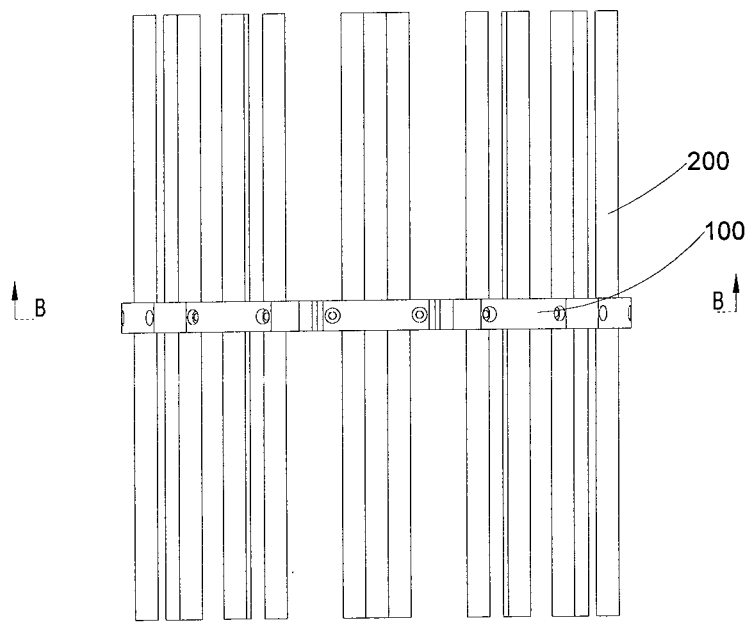
FIG. 2 is a view showing a use state of a cable protection device according to an embodiment of the disclosure.

Referring to FIG. 2 together, when the cables 200 are not twisted, the cables 200 are respectively clamped and fixed within the penetration holes 131. Since there is a certain distance between the penetration holes 131, there is a certain distance between the cables 200. Further, under the gravity, the cables 200 are in the longitudinal state, so the cables 200 are parallel with each other. Thereby, problems such as collision and entanglement with each other may not occur, and the heat dissipation effect of the cables 200 is ensured.

Figure 3:
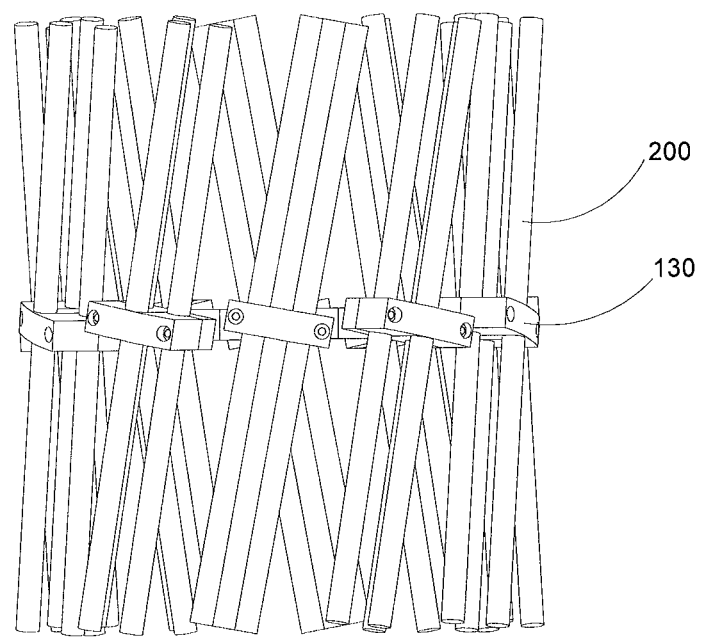
FIG. 3 is a schematic view showing structure of the cables in FIG. 2 in a twisted state.

Referring to FIG. 3 together, during the yaw of the wind generator set, the cables 200 are twisted under the rotation of the nacelle, and each of the clamping members 130 is also deflected relative to the fixing ring 110 by the cables 200. In addition, the torque provided to each cable 200 during the rotation of the nacelle is substantially the same, so the force applied onto each clamping member 130 by the cable 200 is substantially the same. Further, since each clamping member 130 is fixed on the circumferential side of the annular fixing ring 110, the clamping members 130 on the same fixing ring 110 are deflected at substantially the same angle. Therefore, under the limiting of the clamping members 130, the inclination angle of each cable 200 relative to the fixing ring 110 is substantially the same. Thereby, it is ensured that the cables 200 can still maintain in a state of being substantially parallel to each other during the twisting and the cables 200 can still maintain a certain distance between each other without collision and entanglement with each other. Further, the heat dissipation effect of the cables 200 during the twisting can be also ensured.

In addition, during the twisting of the cable 200, the clamping member 130 is deflected relative to the fixing ring 110. Thereby, the relative sliding between the cable 200 and the clamping member 130 is reduced, and the stability of the relative position between the cable 200 and the clamping member 130 is improved, the friction between the cable 200 and the clamp member 130 is reduced, and the service life of the cable 200 is increased.

Figure 4:
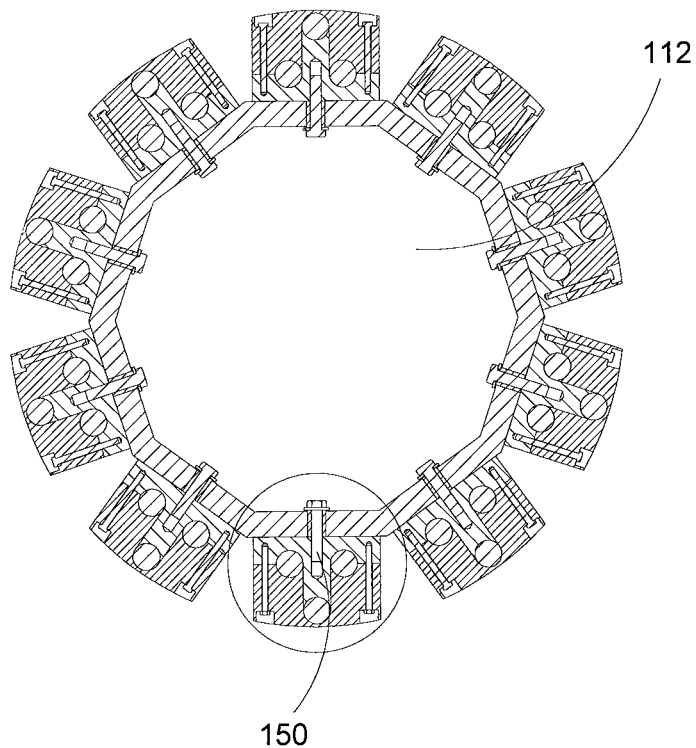
FIG. 4 is a cross-sectional view taken along line B-B in FIG. 2.
Figure 5:
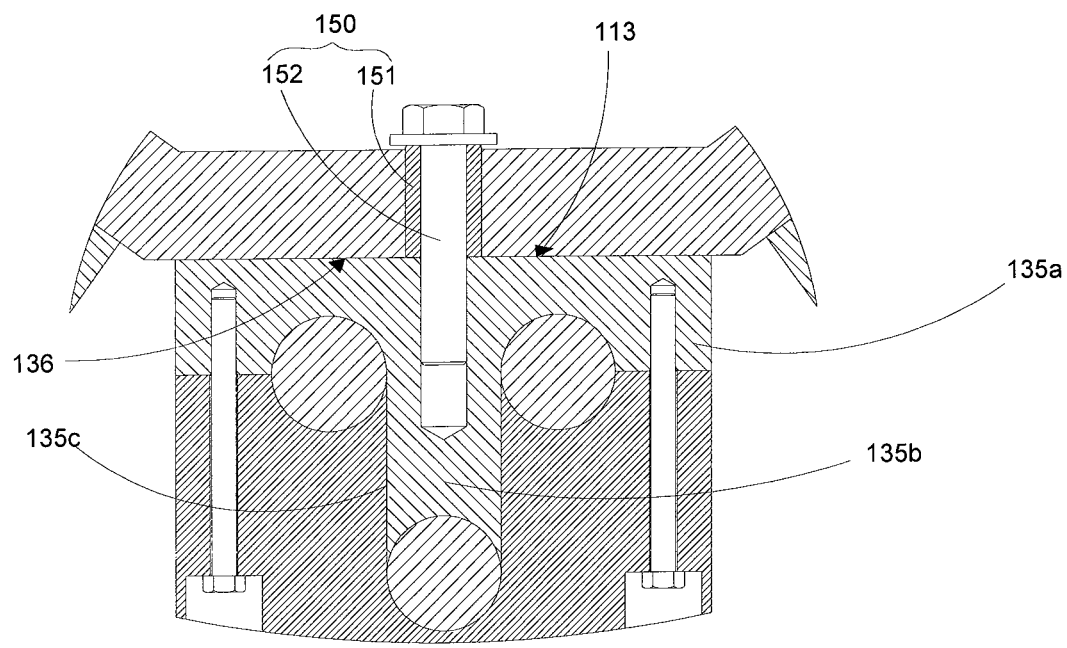
FIG. 5 is an enlarged view of a portion in FIG. 4.
Figure 6:
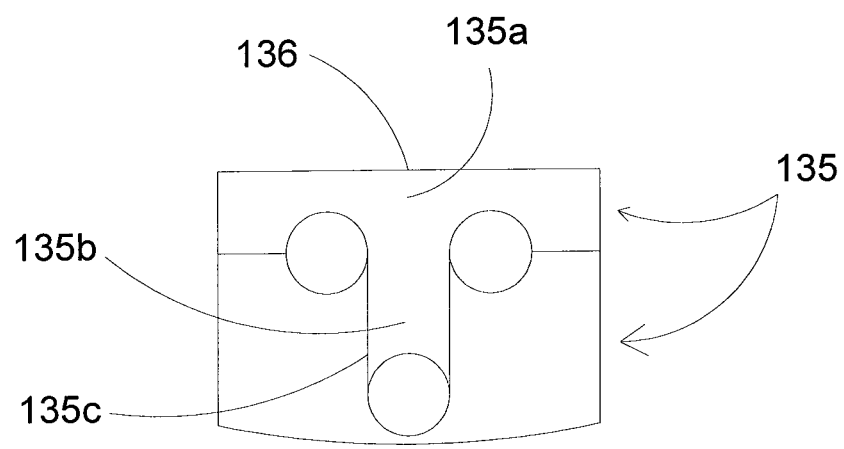
FIG. 6 is a schematic view showing structure of a clamping member of a cable protection device according to an embodiment of the disclosure.

As shown in FIGS. 4 to 6, in some alternative embodiments, the clamping member 130 is integral. Alternatively, the clamping member 130 is divided into two or more sub-clamping members 135. Herein, for convenience of installation, the clamping member 130 includes two or more sub-clamping members 135. Each of the sub-clamping members 135 includes a half slot extending along the first direction, and the half slots of the two or more sub-clamping members 135 are connected to each other to form the penetration hole 131.

In these alternative embodiments, the clamping member 130 is divided into two or more sub-clamping members 135, a half slot is provided in each of the sub-clamping members 135, and the penetration hole 131 is formed by connecting the two half slots. Therefore, the cable protection device 100 according to the disclosure can be disposed onro the cables 200 by abutting the two half slots against each other, whether during the assembly of the cables 200 or after the cables 200 are assembled. Thereby, the cables 200 can be well protected, and the cables 200 can be maintained in accordance with actual needs later.

It may be appreciated that the number of the sub-clamping members 135 is not limited. For example, the number of the sub-clamping members 135 may be two, i.e. respectively, a first sub-clamping member and a second sub-clamping member, three half slots are provided in either of the first and second sub-clamping members, and the half slots of the first and second sub-clamping members are engaged with each other to form three penetration holes 131. Alternatively, the clamping member 130 includes three sub-clamping members 135 which are successively distributed along the circumferential direction of the clamping member 130, two half slots are provided in each of the three sub-clamping members 135 along the circumferential direction thereof, and the half slots of the three sub-clamping members 135 are spliced to each other to form the three penetration holes 131 and the like. The penetration holes 131 can be formed as long as the half slots in the sub-clamping members 135 are spliced to each other.

In these alternative embodiments, the half slots of the sub-clamping members 135 are spliced to each other to form three penetration holes 131, such that the cables 200 for the three-phase alternating current of the wind generator set can be respectively disposed within the three penetration holes 131 through the clamping members 130 according to the phase. This facilitate the investigation of the faulty cable 200 according to the phase later and the maintenance of the cable 200 later.

In some alternative embodiments, the clamping member 130 may be deflectable about the vertical axis x on the attaching surface 113 by using various manners. As an alternative embodiment, the cable protection device 100 further comprises a rotating shaft 150, which is disposed at the fixing ring 110 along the vertical axis x, and the clamping member 130 is rotatably connected to the fixing ring 110 through the rotating shaft 150.

The clamping member 130 may be rotatably connected to the fixing ring 110 through the rotating shaft 150 by using various manners. For example, the fixing ring 110 are fixedly connected to the rotating shaft 150, and the clamping member 130 is rotatably sleeved outside the rotating shaft 150. Alternatively, a sleeve hole is provided in the fixing ring 110 along the vertical axis x, and the rotating shaft 150 is rotatably sleeved within the sleeve hole relative to the fixing ring 110 and is fixedly connected to the clamping member 130 and the like, as long as the clamping member 130 is rotatably connected to the fixing ring 110 through the rotating shaft 150.

In addition, in these alternative embodiments, since the cable 200 is generally disposed inside the tower 400 along a longitudinal direction, the cable 200 is deflectable relative to the longitudinal direction, and meanwhile, the cable 200 is deflectable with respect to the vertical axis x through the clamping member 130 and the rotating shaft 150, such that the cable 200 is deflectable within a certain range. Therefore, the cable 200 clamped within the penetration hole 131 is deflectable about the vertical axis x relative to the fixing ring 110 within a certain range and has a limited deflection angle. Thereby, the problem that the cables 200 are entangled with each other due to twisting can be effectively prevented, while the heat dissipation effect of the cables 200 can be ensured.

In some alternative embodiments, the clamping member 130 has a contact plane 136, through which the clamping member 130 is disposed facing the attaching surface 113 and the clamping member 130 is deflected about the vertical axis x on the attaching surface 113. In these alternative embodiments, the clamping member 130 is disposed facing the attaching surface 113 through the contact plane 136, such that the surface contact between the clamping member 130 and the fixing ring 110 is utilized. Therefore, the attaching surface 113 can provide a limiting to the clamping member 130, and the clamping member 130 may only be deflected substantially relative to the vertical axis x on the attaching surface 113.

On one hand, when the cables 200 are twisted by force, if the cables 200 are deflected toward the inner side of the fixing ring 110, the distance between the cables 200 located in the different clamping members 130 is reduced, and accordingly, the heat dissipation space is reduced and the heat dissipation effect of the cables 200 is affected. The clamping member 130 according to the present embodiment moves along the attaching surface 113, and under the limiting provided by the attaching surface 113, the clamping member 130 cannot be deflected toward the inner side of the fixing ring 110. Therefore, the cables 200 clamped in the clamping member 130 are not deflected toward the inner side of the fixing ring 110, and thereby the heat dissipation space inside and outside the fixing ring 110 is hardly reduced, and accordingly the heat dissipation effect is ensured.

On the other hand, if the clamping member 130 is deflected toward the inner side of the fixing ring 110, the cables 200 will be deflected toward the inner side of the fixing ring 110 by the clamping member 130. Since the deflection angle of the clamping member 130 toward the inner side of the fixing ring 110 is limited while the cable 200 has a certain flexibility, under the inertial force, the deflection angle of the cable 200 may be greater than the deflection angle of the clamping member 130, such that a portion of the cable 200 located at the edge of the penetration hole 131 may be bent toward the inner side of the fixing ring 110 relative to the clamping member 130, and the service life of the cable 200 may be accordingly damaged. Similarly, if the clamping member 130 is deflected outwardly relative to the fixing ring 110, the portion of the cable 200 located at the edge of the penetration hole 131 is bent toward the outer side of the fixing ring 110 relative to the clamping member 130, and the service life of the cable 200 may also be accordingly damaged. In the present embodiment, the clamping member 130 is not deflected toward the inner or outer side of the fixing ring 110 under the limiting of the attaching surface 113, thereby the damage of the life caused by the bending of the cable 200 in the above case is prevented.

As an alternative embodiment, the fixing ring 110 has a sleeve hole (not shown in the figures) disposed along the vertical axis x, and the clamping member 130 has a mounting slot (not shown in the figures) disposed along the vertical axis x. The rotating shaft 150 is disposed penetrating through the sleeve hole and protrudes from the outer side surface of the fixing ring 110. The clamping member 130 is sleeved onto the rotating shaft 150 protruding from the outer side of the fixing ring 110 through the mounting slot, the rotating shaft 150 is rotatably connected into the sleeve hole, and the clamping member 130 is fixed to the rotating shaft 150, such that the clamping member 130 is rotatably coupled to the fixing ring 110 by the rotating shaft 150.

It may be appreciated that the rotating shaft 150 may be disposed by using various manners. For example, the rotating shaft 150 includes a sliding bearing 151 which is rotatably mounted within the sleeve hole and a bolt 152 which is fixed to the sliding bearing 151. The bolt 152 is rotatable relative to the fixing ring 110 through the sliding bearing 151, and the bolt 152 protrudes from the outer side surface of the fixing ring 110 and is fixedly mounted to the clamping member 130 through the mounting slot. The bolt 152 may be fixed to the sliding bearing 151 and the clamping member 130 by screw connection or interference fit. For convenience of installation and disassembly, the bolt 152 herein is fixed to the sliding bearing 151 and the clamping member 130 by the screw connection.

In some alternative embodiments, the number of the sub-clamping members 135 is two, i.e., respectively a first sub-clamping member and a second sub-clamping member. The first sub-clamping member has a T shape with a first arm 135a and a second arm 135b perpendicular to each other. The contact plane 136 is located on the side of the first arm 135a away from the second arm 135b. The second sub-clamping member has a groove 135c extending along the first direction, to enable the second arm 135b to be received in the groove 135c, such that the first clamping member and the second clamping member can be connected to each other by the second arm 135b and the groove 135c.

In these alternative embodiments, the first sub-clamping member has a T shape, and the contact plane 136 is located on the side of the first arm 135a away from the second arm 135b, leaving sufficient position for the provision of the mounting slot, such that the mounting slot can extend from the contact plane 136 to the second arm 135b. Meanwhile, since the first sub-clamping member has a T shape and the second sub-clamping member has a groove 135c, the first sub-clamping member and the second sub-clamping member can be connected to each other by the second arm 135b and the groove 135c. Therefore, by providing a limiting to the first sub-clamping member by the groove 135c, the stability of the relative position between the first sub-clamping member and the second sub-clamping member is ensured.

The first sub-clamping member and the second sub-clamping member may be connected to each other by using various manners. For example, the first sub-clamping member and the second sub-clamping member are abutted and bonded with each other to form the clamping member. Alternatively, the first sub-clamping member and the second sub-clamping member are connected to each other by a clamping bolt or the like. Herein, in order to ensure the connection strength between the first sub-clamping member and the second sub-clamping member, the first sub-clamping member and the second sub-clamping member are connected to each other by the clamping bolt, wherein a bolt connecting hole is provided in the outer surface of the second sub-clamping member away from the first sub-clamping member, a bolt connecting slot is provided at a position on the first sub-clamping member corresponding to the bolt connecting hole, and the clamping bolt penetrates the bolt connecting hole and is located within the bolt connecting slot.

In addition, in order to ensure a substantially flatness of the outer surface of the second sub-clamping member, a sunken platform is provided in the outer surface of the second sub-clamping member. The sunken platform is formed by recessing from the outer surface of the second sub-clamping member along the direction adjacent to the first sub-clamping member. The bolt connecting hole is disposed in the sunken platform, such that the clamping bolt does not protrude from the outer surface of the second sub-clamping member when it is located within the bolt connecting hole. Thereby, the flatness of the outer surface of the second sub-clamping member is ensured.

Three half slots are provided in either of the first sub-clamping member and the second sub-clamping member, and the positions of the half slots in the first sub-clamping member and the second sub-clamping member are not limited herein, as long as the half slots in the first sub-clamping member can be mutually abutted against the half slots in the second sub-clamping member to form three penetration holes 131.

Preferably, one half slot is disposed at the end portion of the second arm 135b away from the first arm 135a, two half slots are respectively disposed at the positions of the first arm 135a on both side of the second arm 135b, and the half slots in the first arm 135a are symmetrically disposed with respect to the second arm 135b. Correspondingly, one half slot is disposed at the bottom of the groove 135c, two half slots are respectively disposed on both sides of the groove 135c, and the half slots on both sides of the groove 135c are symmetrically disposed with respect to the groove 135c.

In these alternative embodiments, when the first sub-clamping member and the second sub-clamping member are connected to each other to form the clamping member 130, and when the cables 200 passing through the penetration holes 131 are twisted by force, the pressures applied to the second arm 135b and the groove 135c by the cables 200 located on both sides of the second arms 135b and the groove 135c are in equilibrium. Therefore, the stability of the relative position between the first sub-clamping member and the second clamping member is ensured.

Figure 7:
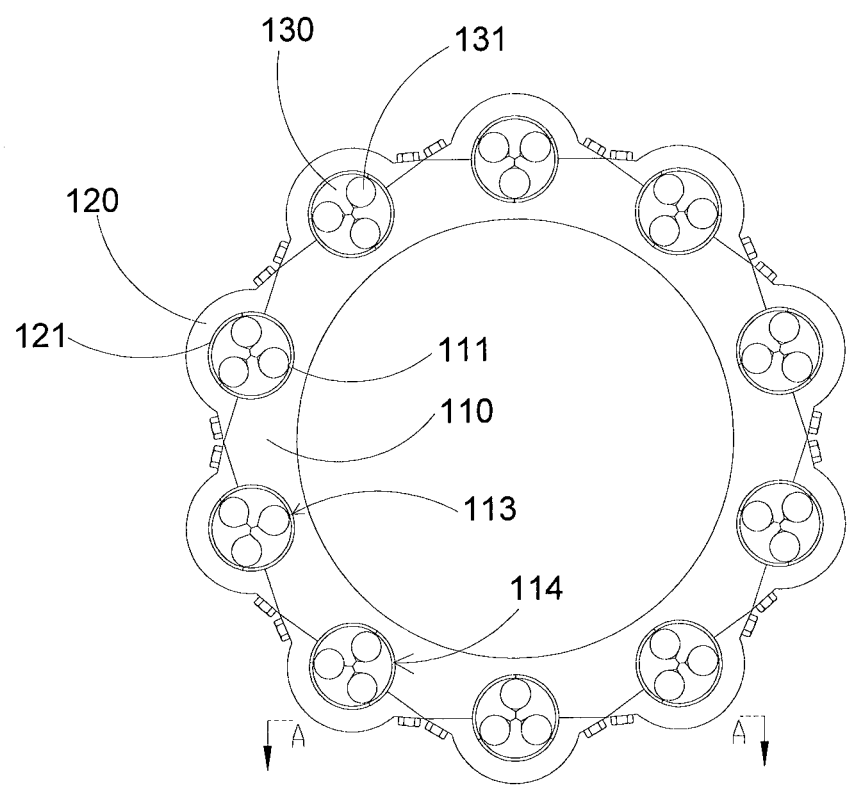
FIG. 7 is a schematic view showing structure of a cable protection device according to another embodiment of the disclosure.

As shown in FIG. 7, in other alternative embodiments, a first half ring 111 having an opening facing outwardly is provided in each attaching surface 113 of the fixing ring 110 along the radial direction of the fixing ring 110. The cable protection device 100 further a clamping block 120 which is disposed on the attaching surface 113 of the fixing ring 110, and the clamping block 120 includes a second half ring 121 which corresponds to the first half ring 111. The first half ring 111 and the second half ring 121 are butted against each other to form a passing-through hole 114 extending along the first direction. The clamping member 130 is rotatably disposed within the passing-through hole 114.

In these alternative embodiments, the cables 200 are clamped within the penetration holes 131 of the clamping members 130, and the clamping members 130 are disposed within the passing-through holes 114, such that the cables 200 are clamped and fixed by the respective penetration holes 131 in a manner of being spaced apart, and the clamping members 130 are spaced apart from each other by the passing-through holes 114.

Figure 8:
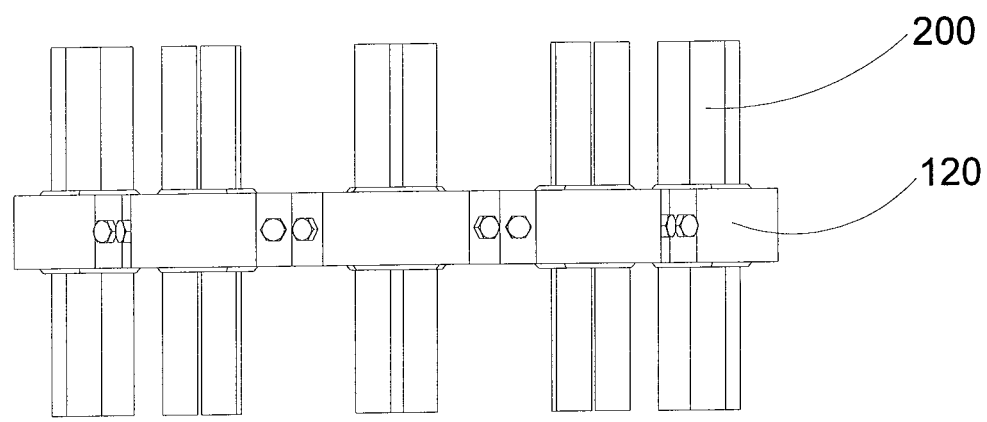
FIG. 8 is a view showing a use state of a cable protection device according to still another embodiment of the disclosure.

As shown in FIG. 8, when the cables 200 are not twisted, the cables 200 are clamped and fixed within the respective penetration holes 131. Since there is a certain distance between the penetration holes 131, there is a certain distance between the cables 200. Further, under the gravity, the cables 200 extend in the longitudinal direction, and the cables 200 are in a state of being in parallel to each other. Thereby, problems such as collision and entanglement with each other may not occur, and the heat dissipation effect of the cables 200 is ensured.

Figure 9:
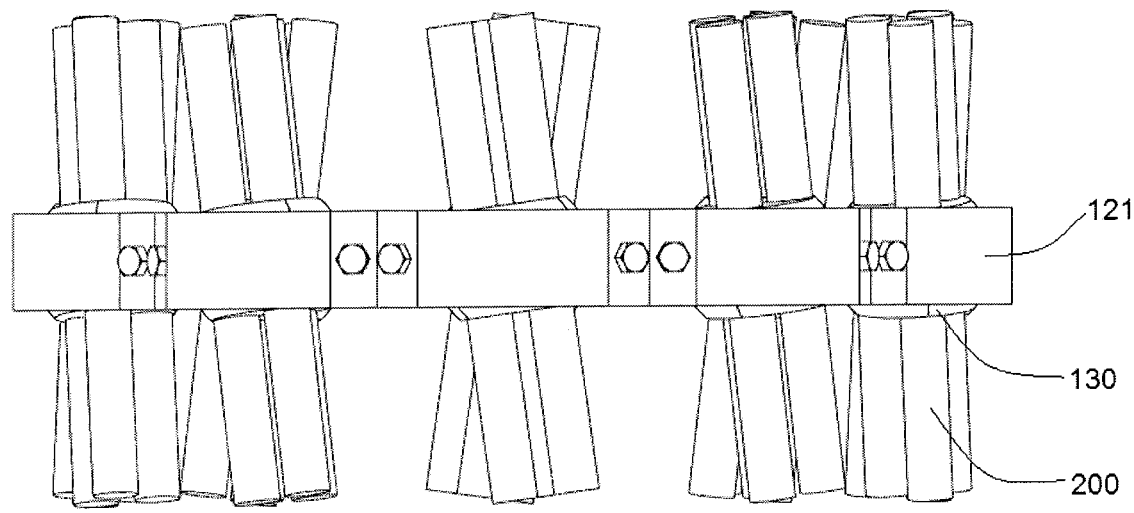
FIG. 9 is a schematic view showing structure of the cables in FIG. 8 in a twisted state.
Figure 10:
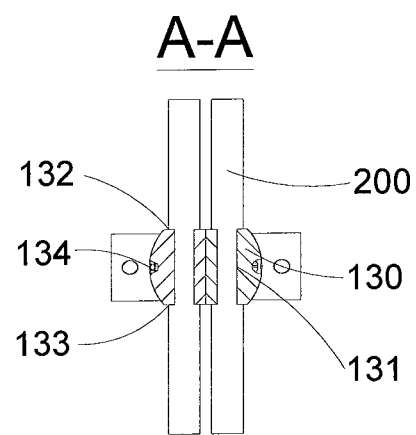
FIG. 10 is a cross-sectional view taken along line A-A in FIG. 7.

During the yaw of the wind generator set, when the cables 200 are twisted under the rotation of the nacelle, as shown in FIG. 9, each of the clamp members 130 rotates within the passing-through hole 114. Since the torque provided to each cable 200 during the rotation of the nacelle is substantially the same, the force applied onto each clamping member 130 by the cable 200 is substantially the same. Further, since each clamping member 130 is disposed on the circumferential side of the annular fixing ring 110, the rotation angle of each clamping member 130 relative to the fixing ring 110 is substantially the same. Under the limiting of the clamping member 130, the inclination angle of each cable 200 clamped in each clamping member 130 relative to the fixing ring 110 is substantially the same. Therefore, the cables 200 can still maintain in a state of being substantially parallel to each other, the problems such as collision and entanglement with each other may not occur, and the heat dissipation effect of the cables 200 is ensured.

In addition, since the clamping member 130 is rotatably disposed relative to the passing-through hole 114, when the cables 200 are twisted, the clamping members 130 rotate relative to the passing-through hole 114, instead that the cables 200 rotate within the penetration holes 131. Therefore, it is possible to prevent the cable 200 and the clamp member 130 from being rubbed against each other to affect the service life of the cable 200.

In the cable protection device 100 according to the disclosure, the clamping block 120 is externally mounted and fixed to the fixing ring 110, for example by screws. Specifically, a screw hole through which the screw pass is provided in the fixing block 120, and a screw slot or a screw through hole engaging with the screw hole is provided on the fixing ring 110, such that the clamping block 120 may be fastened to the fixing ring 110. Since one-to-one connection is achieved between the clamping block 120 and the first half ring 111, it is possible to effectively control the clamping force of each of the clamping members 130 clamped by the passing-through holes 114.

Referring to FIGS. 10 to 14 together, it may be appreciated that the clamping member 130 may be rotatably disposed within the passing-through hole 114 by using various manners. As an alternative embodiment, the clamping member 130 has an outer surface which is arcuate, and the first half ring 111 and the second half ring 121 each have an inner surface which is adapted to the outer surface of the clamping member 130, such that the clamping member 130 is rotatable relative to the first half ring 111 and the second half ring 121.

The outer surface of the clamping member 130 may be disposed to be the circular arc surface by using various manners. For example, the clamping member 130 has a spherical shape, and the inner surfaces of each of the first half ring 111 and the second half ring 121 entirely has a spherical shape, and the inner surface of the passing-through hole 114 has a spherical shape, such that the clamping member 130 is rotatable within the spherical passing-through hole 114. Alternatively, the clamping member 130 has a truncated spherical shape with a first end surface 132 and a second end surface 133 that are opposite in the first direction and a circular arc-shaped surface 134 between the end surface 132 and the second end surface 133. The first direction is the longitudinal direction shown in FIG. 10.

Figure 11:
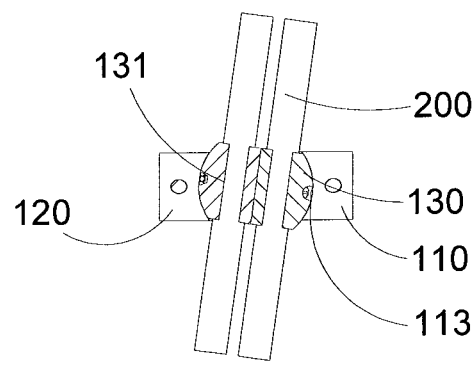
FIG. 11 is a schematic view showing structure of the cables in FIG. 10 in a twisted state.
Figure 12:
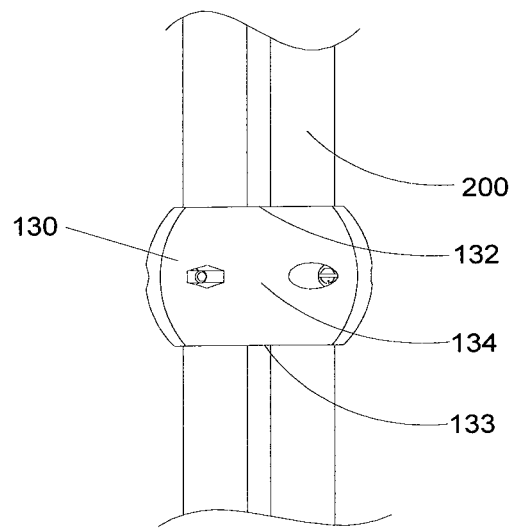
FIG. 12 is a schematic view showing a partial structure of a cable protection device according to another embodiment of the disclosure.
Figure 13:
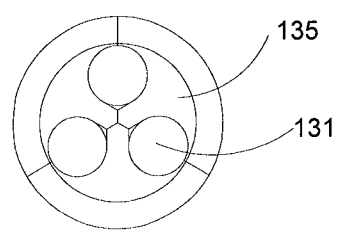
FIG. 13 is a schematic view showing structure of a clamping member of a cable protection device according to still another embodiment of the disclosure.
Figure 14:
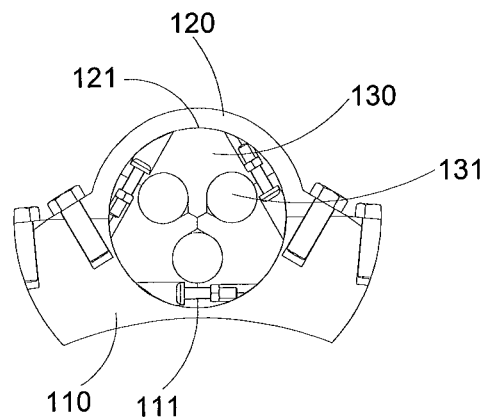
FIG. 14 is a cross-sectional view of a portion of a cable protection device according to still another embodiment of the disclosure.

Preferably, in order to reserve more space to provide the penetration hole 131, the clamping member 130 has a truncated spherical shape, and the penetration hole 131 extends in the first direction from the first end surface 132 to the second end surface 133. Wherein, in order to enable the cables 200 to have a greater degree of rotational freedom, there is a preset distance from the penetration hole 131 to the edge of the passing-through hole 114, as shown in FIG. 11, such that the cables 200 passing through the penetration holes 131 are deflectable in the direction adjacent to the edge of the passing-through hole 114. Meanwhile, since the cables 200 are generally disposed inside the tower of the wind generator set along the longitudinal direction, the cables 200 are deflectable relative to the longitudinal direction, and under the limiting of the passing-through hole 114, the cables 200 passing through the penetration holes 131 are deflectable about the vertical axis x of the attaching surface 113 relative to the fixing ring 110 within a preset range.

In some alternative embodiments, the clamping member 130 includes a plurality of sub-clamping members 135 that are successively distributed along the circumferential direction of the clamping member 130. Further, in order to facilitate disposing the three-phase cables 200, the number of the sub-clamping members 135 is three. Two half slots are provided in each sub-clamping member 135 along its axial direction, and the half slots in the three sub-clamping members 135 are abutted against each other to form three penetration holes 131, and the three sub-clamping members 135 are connected to each other to form the clamping member 130 having the truncated spherical shape. The three penetration holes 131 are provided in the clamping member 130 such that a set of three three-phase cables 200 can be disposed in the same clamping member 130.

It may be appreciated that the three sub-clamping members 135 may be fixed to each other by using various manners. For example, two mounting holes are provided in each of the three sub-clamping members 135, and the three sub-clamping members 135 are assembled together by disposing the fixing bolts within the mounting holes to form the clamping member 130, wherein each mounting hole has a certain depth, so as to prevent the bolt from exposing the outer surface of the sub-clamping member 135 and affect the free rotation of the clamping member 130 within the passing-through hole 114.

The number of the clamping blocks 120 is not limited herein. The number of the clamping blocks 120 is the same as the number of the first half rings 111 on the fixing ring 110, and the clamping blocks are provided corresponding to the first half rings 111, such that the cable protection device 100 entirely has a ring shape, and the cables 200 fixed by the cable protection device 100 is distributed in a ring shape.

Figure 15:
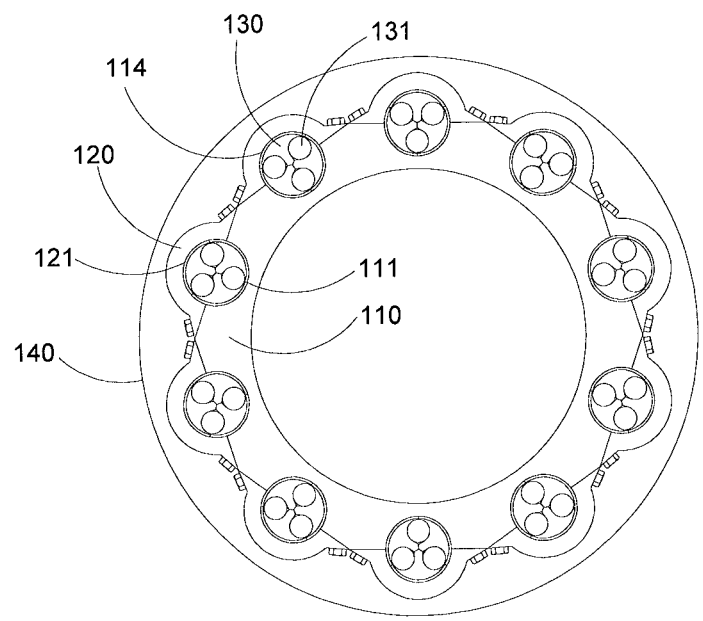
FIG. 15 is a schematic view showing structure of a cable protection device according to another embodiment of the disclosure.

Referring to FIG. 15, in some alternative embodiments, the cable protection device 100 further comprises a damping ring 140. The damping ring 140 is sleeved outside the clamping member 130 along the first direction. The damping ring 140 is made of the shock absorbing material, such that the damping ring 140 can absorb the external shock and ensure that the clamping relationship between the cables 200 and the clamp members 130 is not loosened due to the shock impact. The first direction is the direction perpendicular to the paper surface in FIG. 15

Figure 16:
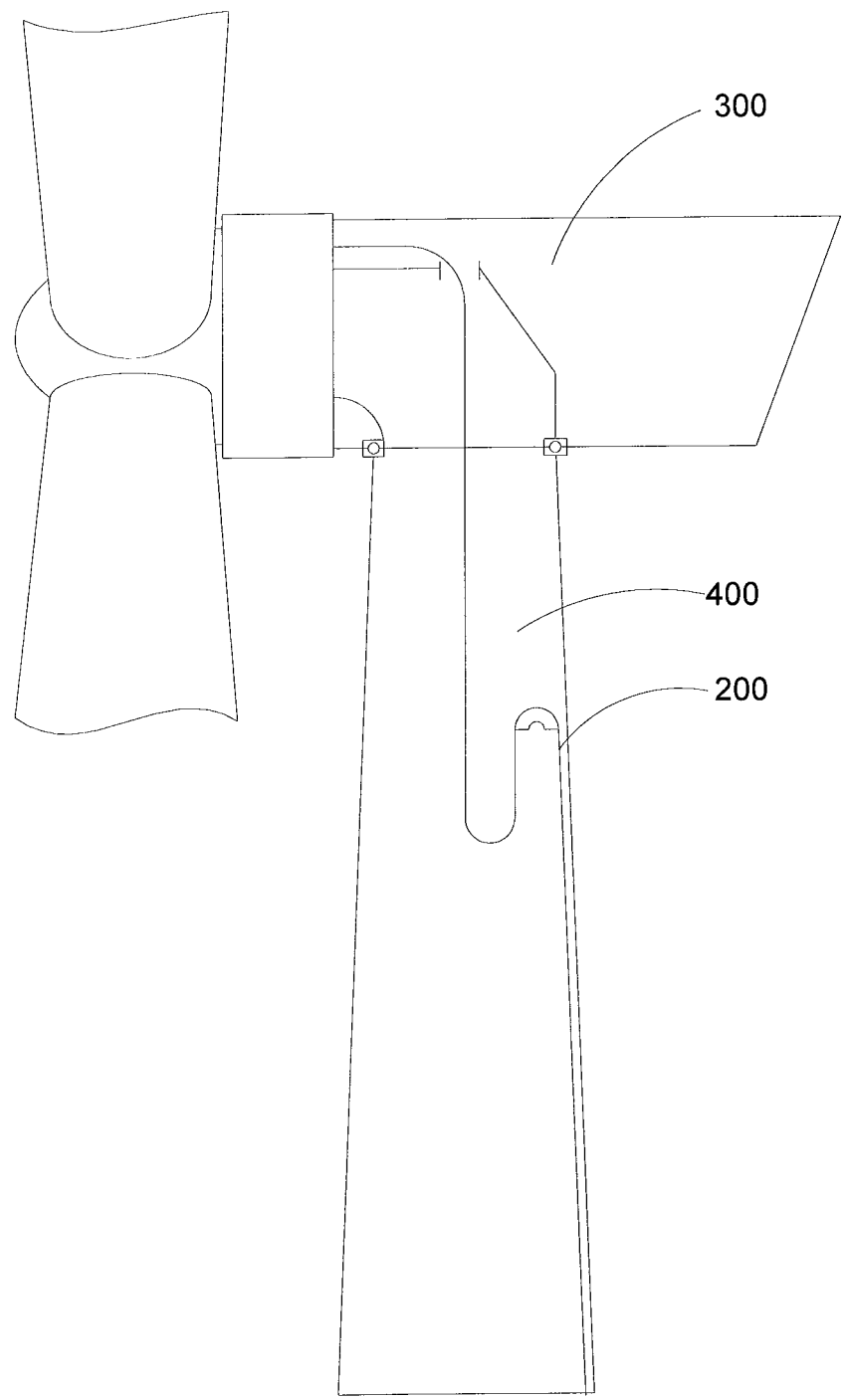
FIG. 16 is a schematic view showing structure of a wind generator set in the prior art.

FIG. 16 is a schematic view showing structure of a wind generator set in the prior art, including a nacelle 300, a tower 400, and cables 200. The nacelle 300 is rotatable relative to the tower 400 and drives the cables 200 to rotate. During the rotation of the nacelle 300 according to the wind direction, the rotation angle of the nacelle 300 can reach 2-3 circles, which causes the cables 200 to have a corresponding twist, resulting in the entanglement of cables 200 with each other and affecting the heat dissipation effect of the cables 200.

As shown in FIGS. 17 to 26, the embodiment of the disclosure further provides a wind generator set including a nacelle 300, a tower 400, cables 200, and the above-mentioned cable protection device 100. The nacelle 300 is mounted on the top of the tower 400 in a manner of being rotatable about the longitudinal direction. The tower 400 extends in the longitudinal direction. The cables 200 are disposed downwardly from the nacelle 300 along the tower 400. The cable protection device 100 is mounted to the cables 200 inside the tower 400.

In the present embodiment, one cable protection device 100 can simultaneously clamping and fixing a plurality of cables 200, and separating the cables 200 from each other. When the cables 200 are twisted as the nacelle 300 rotates, the cables 200 still maintains in a state of being separated from each other.

In some alternative embodiments, two or more cable protection device 100 are used, and the two or more cable protection devices 100 are mounted onto the cables 200 in a manner of being spaced apart in the extending direction of the cables 200. The distance between the cable protection devices 100 may be appropriately adjusted according to the use requirements, and an appropriate number of cable protection devices 100 may be used according to the length of the twisted portion of the entire cable 200, in order to effectively control the twisting angle between the adjacent cable protection devices 100, thereby preventing the distance between the two adjacent clamped cables 200 from being too small due to excessive twisting angle.

The cable 200 includes a longitudinal segment, a bending segment and an attachment segment that are successively distributed. The longitudinal segment is disposed to be extended in the longitudinal direction after being drawn from the nacelle 300. The attachment segment of the cable 200 is attached to the inner wall of the bottom of the tower 400. The wind generator set further comprises a bending support member 700. The bending segment between the longitudinal segment and the attachment segment is erected onto the bending support member 700 such that the longitudinal segment transitions to the attachment segment via the bending segment.

The cable protection devices 100 are spaced apart to the longitudinal segment of the cable 200 along the longitudinal direction. Among the cable protection devices 100, the lowest cable protection device 100a that is lowest in the longitudinal direction is included, and the bending segment of the cable 200 is distributed after the lowest cable protection device 100a along the extending direction of the cables 200. When the lowest cable protection device 100a is twisted under the twisting of the cable 200, the bending segment of the cable 200 may be twisted, which may cause a relative displacement between the bending segment and the bending support member 700, affect the stability of the relative position between the bending segment and the bending support member 700, and in turn affect the stability of relative position between the attachment segment and the inner wall of the tower 400.

In some alternative embodiments, the wind generator set further comprises a support member 500. The support member 500 is disposed outside the lowest cable protection device 100a that is lowest among the cable protection devices 100 in the longitudinal direction, to enable the lowest cable protection device 100a to reciprocate in the longitudinal direction.

Figure 17:
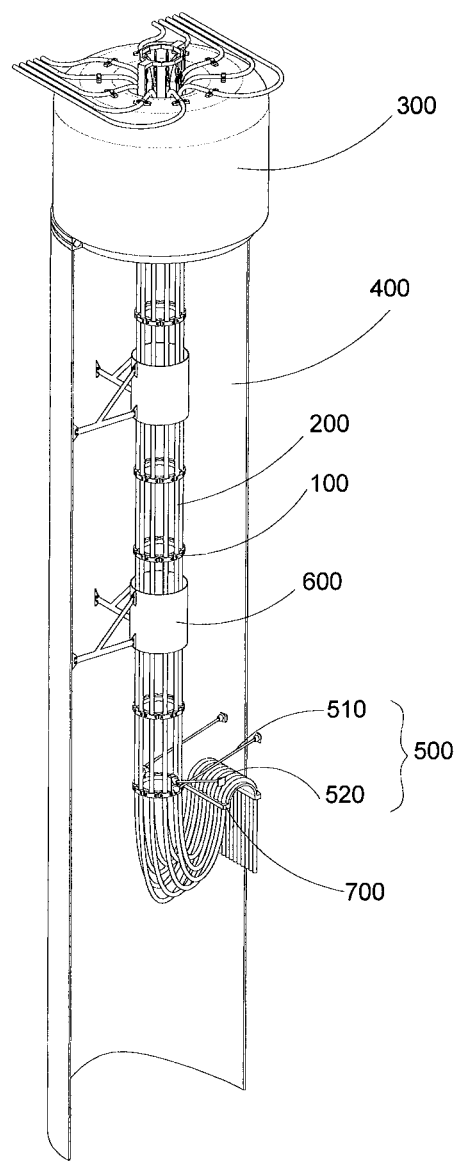
FIG. 17 is a schematic view showing structure of a wind generator set according to an embodiment of the disclosure.
Figure 18:
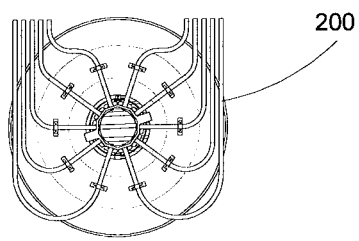
FIG. 18 is a top view of FIG. 17.
Figure 19:
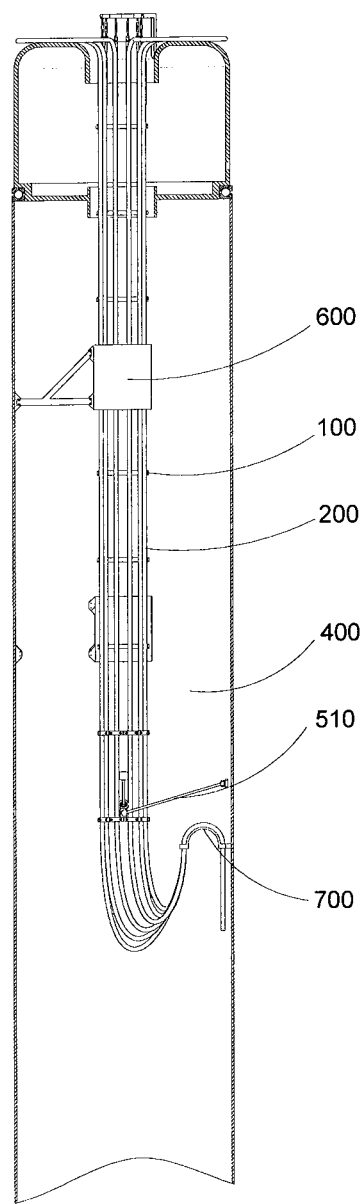
FIG. 19 is a cross-sectional view of a wind generator set according to an embodiment of the disclosure.
Figure 20:
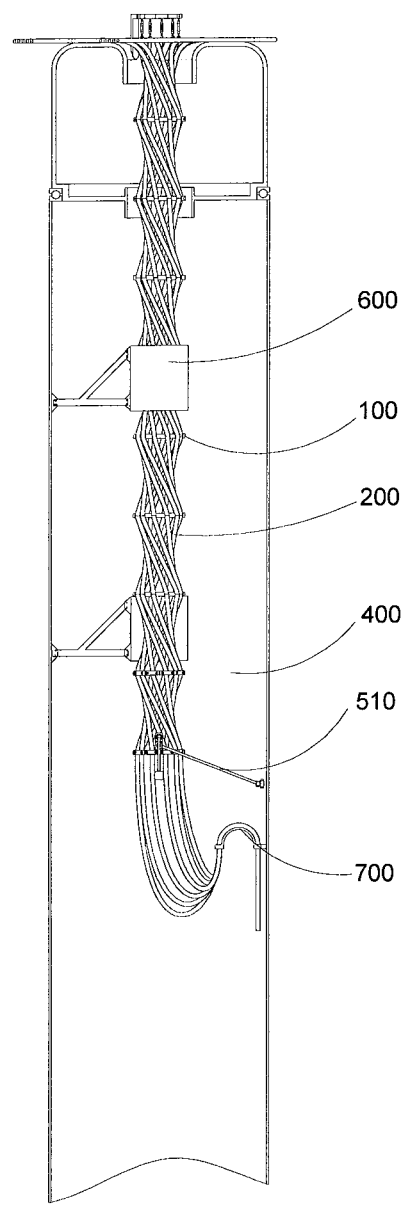
FIG. 20 is a schematic view showing structure of the cables in FIG. 19 in a twisted state.
Figure 21:
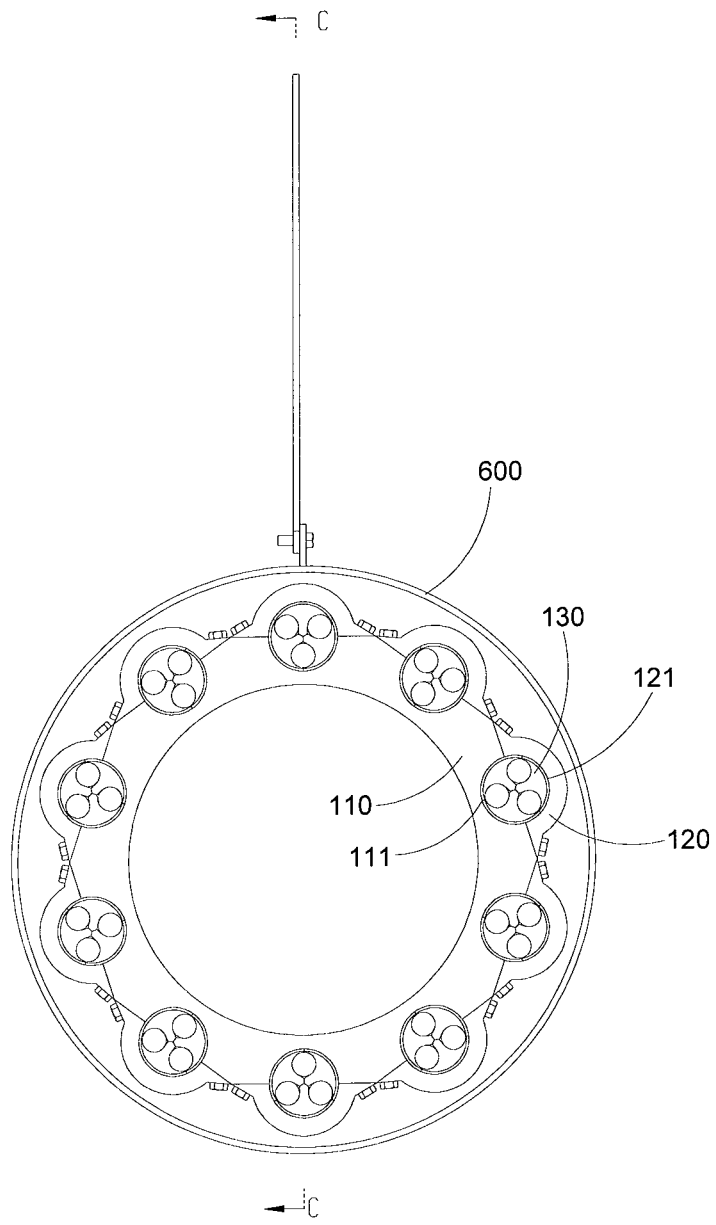
FIG. 21 is a schematic view showing a partial structure of a wind generator set according to an embodiment of the disclosure.
Figure 22:
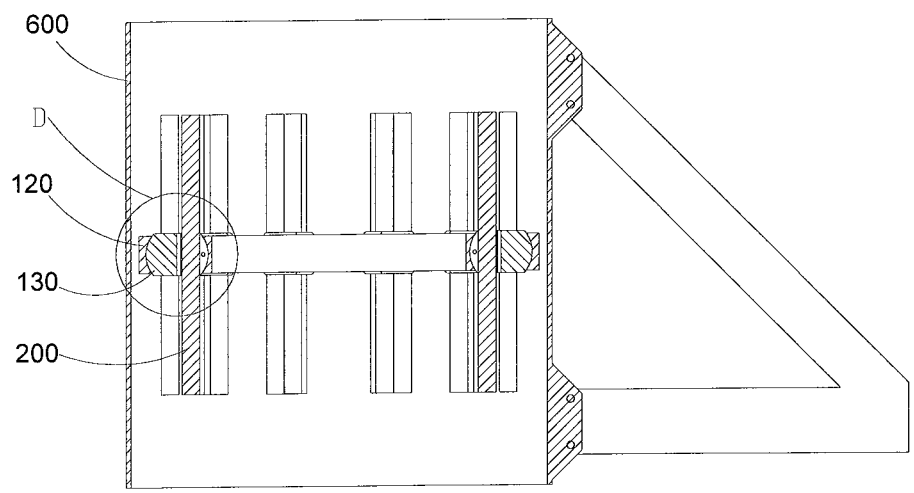
FIG. 22 is a cross-sectional view taken along line C-C in FIG. 21.
Figure 23:
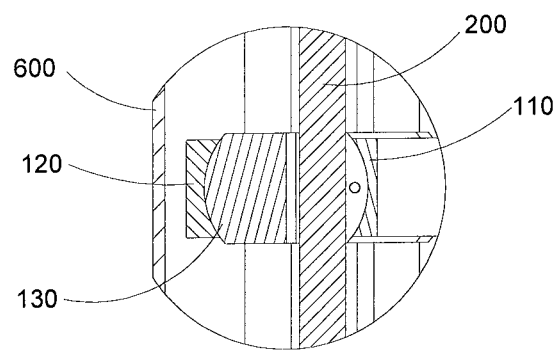
FIG. 23 is a detailed schematic view of the portion D in FIG. 22.

As shown in FIG. 17, the plurality of cable protection devices 100 are spaced apart in the longitudinal direction, and the support member 500 is disposed outside the lowest cable protection device 100a at the lowest position, such that the lowest cable protection device 100a can reciprocate in the longitudinal direction. Therefore, the twisting of the lowest cable protection device 100a can be prevented, the cables 200 herein can be prevented from being twisted, thereby the twisting of the bending segment located after the lowest cable protection device 100a can be prevented. Accordingly, the stability of the relative position between the bending segment and the bending support member 700 is improved, while the stability of relative position between the attachment segment and the inner wall of the tower 400 is also improved.

The support member 500 may be disposed by using various manners. As an alternative embodiment, the support member 500 includes two first connecting members 510, which are disposed inside the tower 400 in a manner of being spaced apart and in parallel in the horizontal direction. The first connecting member 510 includes a first end 511 and a second end 512 that are opposite. The first end 511 is hinged to the lowest cable protection device 100a, and the second end 512 is hinged to the inner wall of the tower 400. The two first connecting members 510 arranged in parallel on both sides of the lowest cable protection device 100a can effectively prevent the cable protection device 100 from being twisted as the cables 200 are twisted.

When the lowest cable protection device 100a moves only under the limiting of the first connecting member 510, the lowest cable protection device 100a may also sway in the horizontal direction, causing the cables 200 at the lowest cable protection device 100a to sway in the horizontal plane, resulting in the bending segment located after the lowest cable protection device 100a to sway, and in turn affecting the stability of the relative position between the bending segment and the bending support member 700.

In some alternative embodiments, the support member 500 further comprises a second connecting member 520. The second connecting member 520 is disposed in different plane from the first connecting member 510 in the first direction, and the second connecting member 520 has a projection on a horizontal plane, which intersects with the projection of the first connecting member 510 on the horizontal plane. The second connecting member 520 includes a first connecting end 521 and a second connecting end 522 that are opposite. The first connecting end 521 is hinged to the lowest cable protection device 100a, and the second connecting end 522 is hinged to the inner wall of the tower 400.

In the present embodiment, the support member 500 further comprises the second connecting member 520, and the second connecting member 520 provides to the lowest cable protection device 100a a limiting force in the horizontal direction. Since the projections of the second connecting member 520 and the first connecting member 510 on the horizontal plane intersect, the limiting forces provided to the lowest cable protection device 100a by the second connecting member 520 and the first connecting member 510 have different directions, thereby weakening or even preventing the lowest cable protection device 100a from swaying in the horizontal direction.

The angle between the projections of the first connecting member 510 and the second connecting member 520 on the horizontal plane is not limited. Preferably, the angle between the projections of the first connecting member 510 and the second connecting member 520 on the horizontal plane is 90 degrees.

Figure 25:
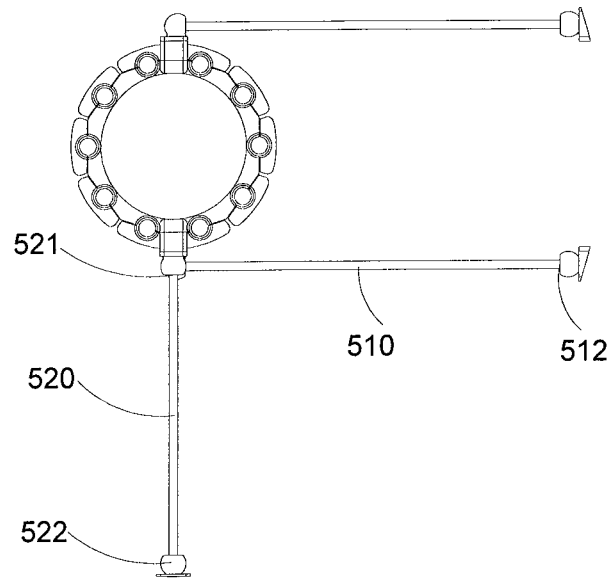
FIG. 25 is a top view of a support member of a wind generator set according to an embodiment of the disclosure.
Figure 26:
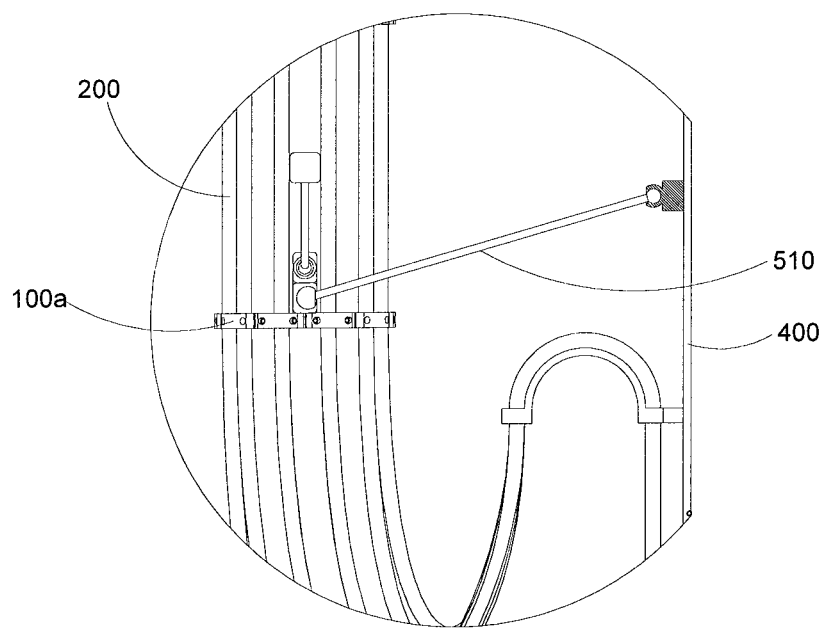
FIG. 26 is a schematic view showing structure of a position of a support member of a wind generator set according to an embodiment of the disclosure.

As shown in FIG. 25, when the lowest cable protection device 100a moves up and down only under the limiting of the first connecting member 510, the lowest cable protection device 100a may also sway in the left-right direction shown in FIG. 25. When the lowest cable protection device 100a moves up and down only under the limiting of the second connecting member 520, the lowest cable protection device 100a may also sway in the up-down direction shown in FIG. 25. Therefore, when the first connecting member 510 and the second connecting member 520 are perpendicular to each other, the first connecting member 510 and the second connecting member 520 provides to the lowest cable protection device 100a limiting forces which are both in the horizontal direction but have opposite directions, such that the lowest cable protecting device 100a does not sway by the first connecting member 510 cooperation with the second connecting member 520.

In addition, the first direction is the direction perpendicular to the paper surface in FIG. 25, and the second connecting member 520 may be disposed in different plane from the first connecting member 510 in the first direction by using variable manners. For example, when first connecting member 510 and the second connecting member 520 are both in the horizontal plane, the first connecting member 510 and the second connecting member 520 are located in horizontal planes which are spaced apart along the longitudinal direction. Alternatively, the first connecting member 510 and the second connecting member 520 are located in different inclined surfaces, such that the first connecting end 521 and the first end 511 are sequentially disposed to the lowest cable protection device 100a in the longitudinal direction.

In these alternative embodiments, since the first connecting member 510 and the second connecting member 520 are disposed in different planes in the longitudinal direction, that is, the first connecting end 521 and the first end 511 are disposed to the lowest cable protection device 100a in the longitudinal direction, so the lowest cable protection device 100a can move in the longitudinal direction by the guiding of the first connecting end 521 and the first end 511. During the twisting of the cables 200, the length of the longitudinal segment in the longitudinal direction is reduced due to the twisting, the respective cable protection devices 100 move upward in the longitudinal direction under the twisting of the cables 200, and the lowest cable protection device 100a moves upward in the longitudinal direction. Therefore, it is possible to prevent the service life of the cables 200 from being affected due to the occurrence of twisting between the vertical segment and the lowest cable protection device 100a.

Therefore, in the present embodiment, by the design of the two first connecting members 510 and one second connecting member 520, it is not only possible to prevent the cable protection device 100a from being twisted or swayed in the horizontal plane, but also make the lowest cable protection device 100a move up and down in the longitudinal direction. Therefore, the cables 200 are better protected, and the service life of the cables 200 is improved, without affecting the relative position of the bending segment and the bending support member 700.

It is generally appreciated that the three connecting members (i.e., the two first connecting members 510 and the second connecting member 520) may have rod-like structures, or other structural members that provide connection and withstand corresponding tension and stress are possible.

The two first connecting members 510 are parallel to each other, which may be construed as that the lines between the hinging points of the two first connecting members 510 are parallel to each other. The term "parallel to each other" herein does not absolutely require the two first connecting members 510 to be disposed in parallel, but the first connecting members 510 may be abstracted by two hinging points such that the first connecting member 510 is equivalent to a rod-like structure, especially when the first connecting members 510 may be structural members having meander or irregular shape.

Alternatively, in the first connecting members 510 and the second connecting member 520 according to the present embodiment, shaft-joint or ball-joint may be possible, as long as the first end 511 of the first connecting member 510 can move relative to the second end 512, the first connecting end 521 of the second connecting member 520 can move relative to the second connecting end 522, such that the lowest cable protection device 100a connected to the first end 511 and the first connecting end 521 can move up and down inside the tower 400 when the second end 512 and the second connecting end 522 are fixed to the inner wall surface of the tower 400.

Figure 24:
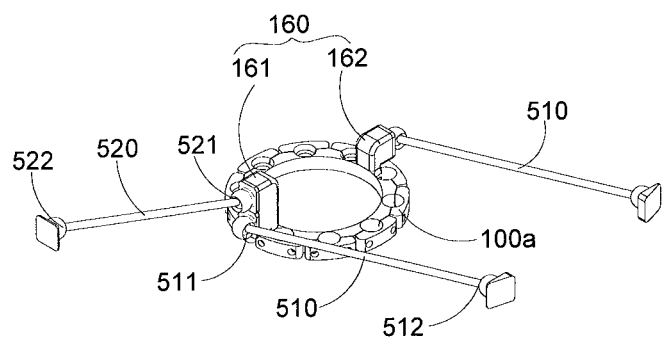
FIG. 24 is a schematic view showing the perspective structure of a support member of a wind generator set according to an embodiment of the disclosure.

FIGS. 24 and 25 shows the ball-joint connection, but the ball-joint connection may be entirely replaced by the shaft-joint connection based on the understanding of those skilled in the art.

In some alternative embodiments, the number of the cables 200 is plural, and the plurality of cables 200 penetrate through the cable protection device 100 to form a cable bundle. The wind generator set includes a sleeve 600, which is sleeved outside the cable bundle and has an aperture larger than the diameter of the cable protector 100. The sleeve 600 is sleeved outside the cable bundle, and the aperture of the sleeve 600 is larger than the diameter of the cable protection device 100, such that there is a gap in the horizontal direction between the sleeve 600 and the cable protection device 100. Therefore, it is possible to guide the cable bundle to be laid in a preset direction, so as to prevent the cable bundle from being violently swayed, without affecting the normal operation of the cable protection device 100. The sleeve 600 is fixedly mounted inside the tower 400, in particular, by means of bracket fixing or the like. The fixed position of the sleeve 600 and the gap between the sleeve 600 and the cable protection device 100 allow the cable protection device 100 to move up and down within the tower 400 along with the cable 200, thereby preventing frictional resistance from to be generated between the cable protector 100 and the sleeve 600, and facilitating driving the cable protection device 100 to move up and down when the cables 200 are twisted.

It may be appreciated that the relative position of the sleeve 600 and the cable protection device 100 is not limited. Herein, in order to prevent damage to the cables 200 caused by the rub between the cables 200 and the sleeve 600 when the cables 200 directly impact the sleeve 600 during the twisting, when the cable 200 are in the longitudinal state, at least one cable protection device 100 is disposed within the sleeve 600, such that the cables 200 impact the sleeve 600 through the cable protection device 100 during the twisting. Through the protection of the cable protection device 100, the damage to the cabled 200 can be effectively reduced, and the service life of the cabled 200 can be improved. The number of the sleeves 600 is not limited herein. The number of the sleeves 600 is one. Alternatively, the number of the sleeves 600 is plural, and the plurality of sleeves 600 are spaced apart in the extending direction of the cable bundle. In the embodiment of the disclosure, the cable protection device 100 includes the fixing ring 110 and the clamping members 130 within which the cable 200 are clamped. Under the limiting of the clamping members 130 to the cables 200, the cables 200 maintains in the state of being substantially parallel to each other, facilitating improvement of the heat dissipation effect of the cables 200. In addition, the clamping members 130 are deflectable relative to the attaching surfaces 113 of the fixing ring 110 within a preset range, such that the clamping members 130 are deflectable relative to the fixing ring 110 during the twisting of the cables 200, thereby effectively improving the stability of the relative position between the cables 200 and the clamping members 130, reducing the friction between the cables 200 and the clamp member 130, and increasing the service life of the cables 200.

It will be appreciated by those skilled in the art that the above-described embodiments are illustrative rather than restrictive. Different technical features appearing in different embodiments may be combined to achieve a beneficial effect. Based on study on the drawings, the specification and the claims, other variations of the disclosed embodiments may be appreciated and effected by those skilled in the art. In the claims, the term "comprising" does not exclude other devices or steps; the indefinite article "a" or "an" does not exclude plural; and the terms "first" and "second" are used to indicate components and are not intended to define any particular order. Any reference numeral in the claims should not be construed as limiting the scope of the disclosure. The functions of the various parts appearing in the claims may be implemented by a single hardware or software module. Some technical features appearing in different claims do not mean that these technical features cannot be combined to achieve a beneficial effect.

What is claimed is:

1. A cable protection device, characterized in comprising:
a fixing ring, which has a through hole extending along a first direction, wherein the fixing ring includes an inner side surface and an outer side surface that are opposite along a radial direction of the fixing ring, the outer side surface comprises two or more attaching surfaces, and a vertical axis is defined in the attaching surface; and
a clamping member, which is disposed on the attaching surface, wherein the clamping member is deflectable at least about the vertical axis, the clamping member has at least one penetration hole penetrating along the first direction, and a cable is clamped within the penetration hole and is deflected about the vertical axis relative to the fixing ring within a preset range,
wherein the clamping member comprises two or more sub-clamping members, each sub-clamping member includes a half slot extending along the first direction, and the half slots of the two or more sub-clamping members are connected to each other to form the penetration hole.

2. The cable protection device according to claim 1, further comprising a rotating shaft which is disposed at the fixing ring along the vertical axis, wherein the clamping member is rotatably connected to the fixing ring through the rotating shaft.

3. The cable protection device according to claim 2, wherein the clamping member has a contact plane, through which the clamping member is disposed facing the attaching surface and the clamping member is deflected about the vertical axis on the attaching surface.

4. The cable protection device according to claim 3, wherein the number of the sub-clamping members is two, respectively a first sub-clamping member and a second sub-clamping member, three half slots are provided in either of the first sub-clamping member and the second sub-clamping member, and the half slots of the first sub-clamping member and the second sub-clamping member are engaged with each other to form three penetration holes.

5. The cable protection device according to claim 4, wherein
the first sub-clamping member has a T shape with a first arm and a second arm perpendicular to each other, and the contact plane is located on a side of the first arm away from the second arm; and
the second sub-clamping member has a groove extending along the first direction, to enable the second arm to be received within the groove, such that the first sub-clamping member and the second sub-clamping member are connected to each other by the second arm and the groove.

6. The cable protection device according to claim 1, wherein
a first half ring having an opening facing outwardly is provided on each mounting face of the fixing ring along the radial direction of the fixing ring;
the cable protection device further comprises a clamping block which is disposed on the attaching surface of the fixing ring, and a second half ring is provided on the clamping block;
the first half ring corresponds to the second half ring, and the first half ring and the second half ring are butted against each other to form a passing-through hole extending along the first direction; and the clamping member is rotatably disposed within the passing-through hole.

7. The cable protection device according to claim 6, wherein the clamping member has an outer surface which is arcuate, and the first half ring and the second half ring each have an inner surface which is adapted to the outer surface of the clamping member.

8. The cable protection device according to claim 1, wherein
the clamping member has a spherical shape; or,
the clamping member has a truncated spherical shape with a first end surface and a second end surface opposite in the first direction and a circular arc-shaped surface connected between the first end surface and the second end surface.

9. The cable protection device according to claim 6, wherein the number of the sub-clamping members are three, two half slots are provided in each of the three sub-clamping members along its circumferential direction, and the half slots of the three sub-clamping members are spliced to each other to form three penetration holes.

10. The cable protection device according to claim 1, further comprising a damping ring, which is sleeved outside the clamping member along the first direction.

11. A wind generator set, characterized in comprising: a nacelle, a tower and the cable protection device according to claim 1, wherein the nacelle is mounted on top of the tower in a manner of being rotatable about a longitudinal direction, the tower extends in the longitudinal direction, the cable is disposed downwardly from the nacelle along the tower, and the cable protection device is mounted onto the cable inside the tower.

12. The wind generator set according to claim 11, wherein the number of the cable protection devices is plural, and the plurality of cable protection devices are disposed to be spaced apart on the cable along the longitudinal direction.

13. The wind generator set according to claim 12, further comprising a support member, which is connected to a lowest cable protection device that is lowest among the cable protection devices in the longitudinal direction, such that the lowest cable protection device is reciprocally movable in the longitudinal direction.

14. The wind generator set according to claim 13, wherein the support member comprises two first connecting members, which are disposed inside the tower in a manner of being spaced apart and in parallel in the longitudinal direction, the first connecting member includes an first end and a second end that are opposite, the first end is hinged to the lowest cable protection device, and the second end is hinged to an inner wall of the tower.

15. The wind generator set according to claim 14, wherein
the support member further comprises a second connecting member, which is disposed in different plane from the first connecting member in the first direction, the second connecting member has a projection on a horizontal plane that intersects with a projection of the first connecting member on the horizontal plane; and
the second connecting member includes an first connecting end and a second connecting end that are opposite, the first connecting end is hinged to the lowest cable protection device, and the second connecting end is hinged to the inner wall of the tower.

16. The wind generator set according to claim 11, wherein
the number of the cable is plural, and the plurality of cables are clamped to the cable protection device to form a cable bundle; and
the wind generator set further comprises a sleeve, which is sleeved outside the cable bundle, and the sleeve has an aperture larger than a diameter of the cable protection device.

17. The wind generator set according to claim 16, wherein the number of the sleeves is plural, and the plurality of the sleeves are spaced apart in an extending direction of the cable bundle.

* * * * *